(12) United States Patent
Højlund Nielsen

(10) Patent No.: US 9,364,789 B2
(45) Date of Patent: Jun. 14, 2016

(54) METHOD FOR RECOVERING HYDROGEN FROM HYDROGEN SULFIDE

(71) Applicant: Haldor Topsøe A/S, Kgs. Lyngby (DK)

(72) Inventor: Poul Erik Højlund Nielsen, Fredensborg (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 14/428,053

(22) PCT Filed: Aug. 15, 2013

(86) PCT No.: PCT/EP2013/067057
§ 371 (c)(1),
(2) Date: Mar. 13, 2015

(87) PCT Pub. No.: WO2014/029680
PCT Pub. Date: Feb. 27, 2014

(65) Prior Publication Data
US 2015/0238899 A1 Aug. 27, 2015

(30) Foreign Application Priority Data

Aug. 21, 2012 (WO) .................. PCT/EP2012/066277

(51) Int. Cl.
| | | |
|---|---|---|
| *C01B 3/08* | (2006.01) | |
| *B01D 53/86* | (2006.01) | |
| *B01J 21/00* | (2006.01) | |
| *B01J 21/04* | (2006.01) | |
| *B01J 21/06* | (2006.01) | |
| *B01J 23/50* | (2006.01) | |
| *B01J 35/00* | (2006.01) | |
| *B01J 35/02* | (2006.01) | |
| *B01J 35/10* | (2006.01) | |

(52) U.S. Cl.
CPC ........... *B01D 53/8612* (2013.01); *B01J 21/005* (2013.01); *B01J 21/04* (2013.01); *B01J 21/063* (2013.01); *B01J 23/50* (2013.01); *B01J 35/0006* (2013.01); *B01J 35/0066* (2013.01); *B01J 35/026* (2013.01); *B01J 35/1009* (2013.01); *B01J 35/1014* (2013.01); *B01J 35/1019* (2013.01); *C01B 3/08* (2013.01); *B01D 2255/104* (2013.01); *B01D 2255/2092* (2013.01); *B01D 2255/20707* (2013.01); *B01D 2255/405* (2013.01); *Y02E 60/36* (2013.01)

(58) Field of Classification Search
CPC .............. C01B 3/08; B01D 2255/104; B01D 2255/20707; B01D 2255/405; B01D 2255/2092; B01J 21/005; B01J 35/026; B01J 35/0066; B01J 21/04; B01J 23/50; B01J 35/0006; B01J 35/1014; B01J 35/1019; B01J 21/063; B01J 35/1009
See application file for complete search history.

(56) References Cited

U.S. PATENT DOCUMENTS

| | | | |
|---|---|---|---|
| 4,021,319 A * | 5/1977 | Moeglich | C25B 1/00 205/342 |
| 5,451,268 A | 9/1995 | Shepherd | |

FOREIGN PATENT DOCUMENTS

| | | |
|---|---|---|
| JP | 2009-185792 A | 8/2009 |
| JP | 2010-51858 A | 3/2010 |

OTHER PUBLICATIONS

Kiuchi et al. "Recovery of hydrogen from hydrogen sulfide with metals or metal sulfides", 1982, Intl. J. hydrogen energy, vol. 7, No. 6. pp. 477-482.*
H. Kiuchi et al., "Recovery of Hydrogen from Hydrogen Sulfide with Metals of Metal Sulfides", International Journal of Hydrogen Energy, Elsevier Science Publishers B.V., Barking, GB, vol. 7, No. 6, Jan. 1, 1982, pp. 477-482.
G.H. Schuetz, "Processses for the Combined Production of Hydrogen and Other Chemical Products: Desulphurization Processes Producing Hydrogen", International Journal of Hydrogen Energy, Elsevier Science Publishers B.V., Barking, GB, vol. 10, No. 7-8, Jan. 1, 1985, pp. 439-446.
S. Lilienfeld et al., "A Study of the Reaction Between Hydrogen Sulfide and Silver", Journal of the American Chemical Society, vol. 52, No. 3, Mar. 1, 1930, pp. 885-892.

* cited by examiner

*Primary Examiner* — Stanley Silverman
*Assistant Examiner* — Syed Iqbal
(74) *Attorney, Agent, or Firm* — Blank Rome LLP

(57) ABSTRACT

The present invention provides a method for recovering hydrogen from hydrogen sulfide using a supported silver catalyst, and a method for purifying a gas stream containing hydrogen sulfide using such a catalyst.

12 Claims, No Drawings

METHOD FOR RECOVERING HYDROGEN FROM HYDROGEN SULFIDE

FIELD OF THE INVENTION

The present invention provides a method for recovering hydrogen from hydrogen sulfide, and a method for purifying a gas stream containing hydrogen sulfide.

BACKGROUND TO THE INVENTION

Gas streams comprising sulfur species, in particular hydrogen sulfide ($H_2S$), originate from various sources. Natural sources of hydrocarbons may comprise hydrogen sulfide, and hydrogen sulfide is a common additive which provides odour to commercial hydrocarbon supplies. In addition, hydrogen sulfide is often present in waste gas streams from industrial processes.

Sulfur compounds, and in particular hydrogen sulfide, have deleterious effects on many chemical processes. The catalysts used in hydrocracking, synthesis gas processing, methanation, reforming, steam reforming and hydrogenation are often poisoned by the presence of $H_2S$. To avoid these deleterious effects, methods are required which can effectively remove sulfur compounds, particularly $H_2S$, without significant effects on other chemical processes. Most suitable are catalytic methods for sulfur removal.

In addition, during gasification of hydrocarbon fuels to synthesis gas, separation of $CO_2$ and $H_2S$ is carried out in an acid gas removal unit. This should take place such that the resulting $CO_2$ stream is pure, and such that the $H_2S$ stream does not contain too much $CO_2$.

WO 2010/048201 discloses a process for the removal/recovery of sulfur from a gas stream.

U.S. Pat. No. 4,582,819 discloses a novel catalytic absorbent composition which is useful for removing hydrogen sulfide.

Kiuchi H. et al. Int. J. Hydrogen Energy, Vol. 7, No. 6, pp. 477-482, 1982, disclose a method in which H2S reacts with metal or metal sulfide. The resulting sulfide goes then through thermal decomposition or oxidation at high temperature, i.e. 600° C. and under significant production of $Ag_2SO_4$. Schultz et al. Int. J. Hydrogen Energy, Vol. 10, No. 7/8, pp. 439-446, 1985, discloses in a more generic way and with reference to Kiuchi H. et al. also a method in which $H_2S$ reacts with metal or metal sulfide, and the resulting sulfide goes then through thermal decomposition or oxidation.

Additional publications in this field include: US2010/0233054, WO 00/02645 as well as JP2010051858A, JP2009185792A, U.S. Pat. No. 5,451,268 and S. Lilienfeld et al, Journal of the American Chemical Society, Vol. 52, No. 3, 1 Mar. 1930, pp. 885-892.

Despite recent advances in the field, there remains a need for a simple, effective method for removal of hydrogen sulfide from a gas stream, preferably in a catalytic process, and preferably with the production of industrially-useful by-products.

SUMMARY OF THE INVENTION

The invention thus provides two methods. The first method of the invention is a method for recovering hydrogen from hydrogen sulfide, and comprises the steps of:
a. reacting hydrogen sulfide with supported silver at a temperature of at least 200° C., whereby the silver is converted to silver sulfide and hydrogen is released; and
b. subjecting the silver sulfide to mild oxidation at a temperature below 450° C., whereby the silver sulfide is converted to silver and sulfur dioxide.

The second method of the invention is a method for purifying a gas stream containing hydrogen sulfide. This method comprises the steps of:
a. passing said gas stream over a bed of supported silver at a temperature of at least 200° C., so that the hydrogen sulfide in the gas stream reacts with said silver, whereby the silver is converted to silver sulfide and hydrogen is released; and
b. subjecting the silver sulfide to mild oxidation at a temperature below 450° C., whereby the silver sulfide is converted to silver and sulfur dioxide.

The silver is supported on a support material. The silver content of the supported silver is suitably 5-10 wt %. The support material suitably has a surface area between 1-200 $m^2/g$ and/or a porosity from 0.2-0.5 $cm^3/g$. The support material has a particle size of between 1-10 mm in diameter. Further details of the support material are described below.

As used herein the term "mild oxidation" means reaction of silver sulfide with an oxidant at low temperatures, i.e. below 450° C.

Mild oxidation is suitably carried out using gaseous oxygen, preferably atmospheric air dilute in oxygen (1-5%). The oxidation step, step b., preferably takes place at a temperature between 200-400° C.

The method may take place during gasification of hydrocarbon fuels to synthesis gas. Suitably, steps a. and b. take place immediately after one another in a continuous process.

Preferably, step a. occurs at a temperature of between 250-500° C., more preferably between 300-450° C.

DETAILED DESCRIPTION OF THE INVENTION

The present invention provides two methods. The first method is a method for recovering hydrogen from hydrogen sulfide.

The first step in the first method is reacting hydrogen sulfide with supported silver at a temperature of at least 200° C., suitably between 200° C. to 600° C. Preferably this step occurs at a temperature of between 250-500° C., more preferably between 300-450° C. In this step, the silver (in oxidation state 0) is converted to silver sulfide and hydrogen is released:

The equilibrium constant for this process at ca. 400° C. is about 30, and the enthalpy is 0.079 kcal/mol; that is essentially thermoneutral.

The silver used in the first step is supported on a support material. Supported silver consists of particles of metallic silver on a support material. Suitable support materials include oxides such as alumina, spinels such as $MgAl_2O_4$, ZnO, $TiO_2$.

The silver content of the supported silver is suitably 5-10 wt %, 5-15 wt % or 5-20 wt %. This should be able to absorb 0.5-2 wt % sulfur, so that temperature increases can be kept under control.

The second step in the method regenerates the silver in its zero oxidation state. In this second step, the silver sulfide is subjected to mild oxidation at below 450° C., whereby the silver sulfide is converted to silver and sulfur dioxide.

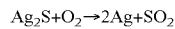

As described above, the term "mild oxidation" involves the reaction of silver sulfide with an oxidant at temperatures below 450° C. To avoid excessive production of $Ag_2SO_4$ mild oxidation is suitably carried out at such temperatures, preferably between 200-400° C.

The oxidant for the second step is most commonly gaseous oxygen, such as atmospheric air dilute in oxygen, e.g. 0.5-5% vol.

The invention also provides a method for purifying a gas stream containing hydrogen sulfide. The method comprises the steps of:
 a. passing said gas stream over a bed of silver at a temperature of at least 200° C., so that the hydrogen sulfide in the gas stream reacts with said silver, whereby the silver is converted to silver sulfide and hydrogen is released; and
 b. subjecting the silver sulfide to mild oxidation at below 450° C., whereby the silver sulfide is converted to silver and sulfur dioxide.

This second method of the invention is most suitable during gasification of hydrocarbon fuels to synthesis gas, in which separation of $CO_2$ and $H_2S$ is carried out in an acid gas removal unit. This should take place such that the resulting $CO_2$ stream is pure, and such that the $H_2S$ stream does not contain too much $CO_2$.

All details of the silver, the support material, oxidant and the associated method steps described above for the first method are equally applicable to the second method of the invention.

For both methods of the invention steps a. and b. may take place immediately after one another in a substantially continuous process (i.e. when the silver is deemed to be sufficiently converted to silver sulfide, the hydrogen sulfide or gas stream may be removed, and replaced by a flow of an oxidant).

Example 1

Suitable sorbent may be prepared as follows. A suitable carrier material chosen from the group of preferably from the group of oxides like alumina and spinels ($MgAl_2O_4$) or titania, preferably with a surface area between 1-200 $m^2/g$ and a porosity from 0.2-0.5 $cm^3/g$ is saturated with a concentrated solution of silver nitrate containing about 2 g in 1 g of water. The saturated carrier is dried and calcined at a temperature of 450° C., whereby the silver nitrate is decomposed into silver, nitrogen oxides and oxygen. In order to obtain a suitable silver content (typically 5-20 wt %) the impregnation may be repeated. The particle size of the carrier may for fixed bed applications vary between 1-10 mm in diameter.

Example 2

1 $m^3$ of the sorbent containing 100 kg of silver is subjected to a dry stream of $CO_2$ containing 0.1% of $H_2S$ at 400° C. The hydrogen sulfide concentration is reduced to about 40 ppm. After passing 1000 $Nm^3/h$ gas for 6 hours the sorbent is partially saturated and the exit hydrogen sulfide concentration starts to rise.

Example 3

100 m3 of the sorbent is subjected to a dry stream of $CO_2$ containing 2.5% $H_2S$ at 400° C. The hydrogen sulfide concentration is reduced to about 0.1% and about 2.4% $H_2$ is produced. The effluent gas is directed to an Acid Gas removal unit and the $H_2$ is recovered. After passing 1000 $Nm^3/h$ in 24 hours the sorbent is partially saturated.

Example 4

The spent sorbent is regenerated by using air with a low oxygen content in order to keep the temperature below 450° C. The inlet temperature may preferably be 200° C. or above and the exit temperature between 375-425° C. The effluent gas may be sent to a WSA (Wet Sulfuric Acid) unit for production of concentrated sulfuric acid.

The invention claimed is:

1. A method for recovering hydrogen from hydrogen sulfide, said method comprising the steps of:
 a. reacting hydrogen sulfide with supported silver at a temperature of at least 200° C., whereby the silver is converted to silver sulfide and hydrogen is released; and
 b. subjecting the silver sulfide to mild oxidation carried out using gaseous oxygen at a temperature below 450° C., whereby the silver sulfide is converted to silver and sulfur dioxide.

2. A method for purifying a gas stream containing hydrogen sulfide, said method comprising the steps of:
 passing said gas stream over a bed of supported silver at a temperature of at least 200° C., so that the hydrogen sulfide in the gas stream reacts with said silver, whereby the silver is converted to silver sulfide and hydrogen is released; and
 subjecting the silver sulfide to mild oxidation carried out using gaseous oxygen at a temperature below 450° C., whereby the silver sulfide is converted to silver and sulfur dioxide.

3. The method according to claim 1, wherein the silver content of the supported silver is 5-10 wt %.

4. The method according to claim 1, wherein the support material has a surface area between 1-200 $m^2/g$ and/or a porosity from 0.2-0.5 $cm^3/g$.

5. The method according to claim 1, wherein the support material has a particle size of between 1-10 mm in diameter.

6. The method according to claim 1, wherein mild oxidation is carried out using atmospheric air dilute in oxygen.

7. The method according to claim 1, wherein step b. takes place at a temperature between 200 and 400° C.

8. The method according to claim 1, wherein the method takes place during gasification of hydrocarbon fuels to synthesis gas.

9. The method according to claim 1, wherein steps a and b take place immediately after one another in a continuous process.

10. The method according to claim 1, wherein step a. occurs at a temperature of between 250-500° C.

11. The method according to claim 1, wherein step a. occurs at a temperature of between 300-450° C.

12. The method according to claim 6, wherein the atmospheric air dilute in oxygen is 0.5-5% vol.

* * * * *